(12) United States Patent
Traynor

(10) Patent No.: US 6,322,266 B1
(45) Date of Patent: Nov. 27, 2001

(54) HAND-HELD DEVICE FOR CLEANING A WINDSHIELD WIPER BLADE

(76) Inventor: Dennis Traynor, 245 Duck Pond La., Brick, NJ (US) 08723

( * ) Notice: Subject to any disclaimer, the term of this patent is extended or adjusted under 35 U.S.C. 154(b) by 0 days.

(21) Appl. No.: 09/436,736

(22) Filed: Nov. 9, 1999

(51) Int. Cl.[7] .............................. A46B 11/10; A46B 5/02
(52) U.S. Cl. .......................... 401/6; 15/160; 401/183; 401/287
(58) Field of Search ........................ 401/6, 7, 9–12, 401/183–185, 287, 286; 15/160, 172, 210.1, 220.4, 104.94; 451/524; 16/430

(56) References Cited

U.S. PATENT DOCUMENTS

| | | | |
|---|---|---|---|
| 412,479 | * 10/1889 | Davis | 401/6 X |
| 855,758 | * 6/1907 | Current | 401/6 |
| 1,160,832 | * 11/1915 | Borsella | 401/6 X |
| 1,598,350 | * 8/1926 | Ibbitson | 401/6 |
| 2,604,650 | * 7/1952 | Mottelson | 15/220.4 |
| 2,813,290 | * 11/1957 | Aschenbach | 401/6 X |
| 3,631,561 | 1/1972 | Aszkenas | 15/250.41 |
| 4,649,593 | 3/1987 | Gilliam, III et al. | 15/250.41 |
| 4,934,024 | * 6/1990 | Sexton, I | 401/6 X |
| 5,243,731 | 9/1993 | Yang | 15/250.41 |
| 5,426,895 | * 6/1995 | Siciliano et al. | 451/524 X |
| 5,442,829 | * 8/1995 | Summers | 15/160 X |
| 5,551,116 | * 9/1996 | Newville | 15/172 |
| 5,697,719 | * 12/1997 | Nicholson | 401/10 |
| 5,860,182 | 1/1999 | Sareyani | 15/114 |

* cited by examiner

Primary Examiner—David J. Walczak
Assistant Examiner—Kathleen J. Prunner
(74) Attorney, Agent, or Firm—Richard L. Miller, P.

(57) ABSTRACT

A windshield wiper blade cleaning device that includes a body for holding in the hand of a user and bristles extending from the body for cleaning the windshield wiper blade. The body is substantially channel-shaped, slender, elongated, and has a web with an inner face and a pair of terminal ends, and a pair of flanges that extend from the web, each of which has an inner face, an outer face, and a pair of terminal ends. The inner face of the web has a length that axially tapers inwardly and upwardly at the pair of terminal ends of the web for facilitating insertion of the windshield wiper blade. The inner face of each flange axially diverges outwardly at the pair of terminal end thereof and convexly upwardly along the length thereof for further facilitating insertion of the windshield wiper blade. The outer face of each flange axially diverges outwardly at the pair of terminal ends thereof and convexly upwardly along the length thereof for maximizing resiliency.

11 Claims, 2 Drawing Sheets

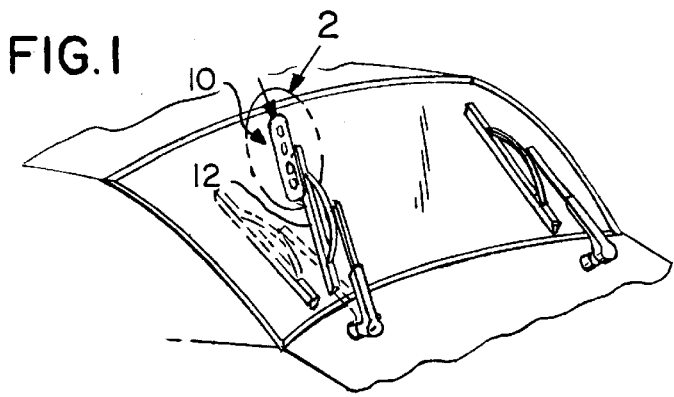
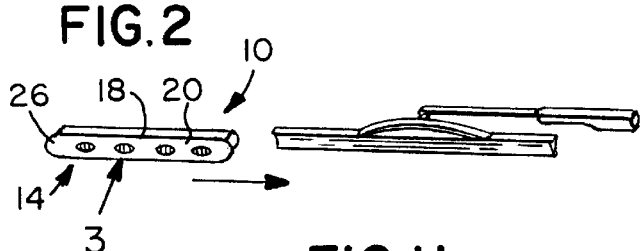
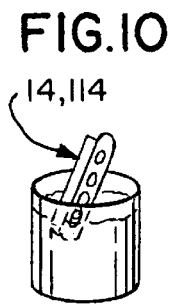
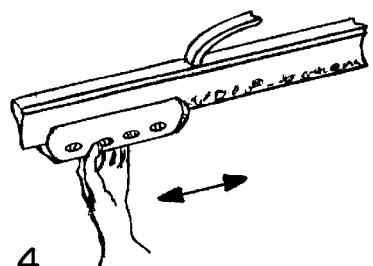
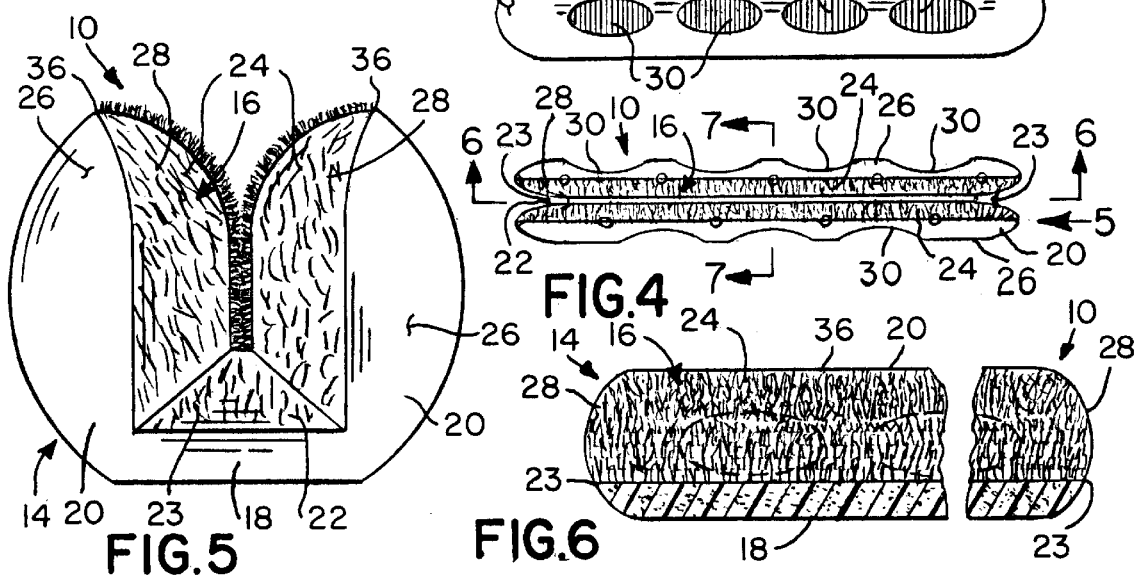

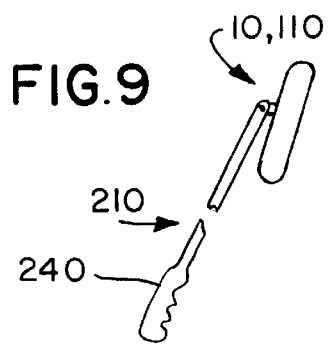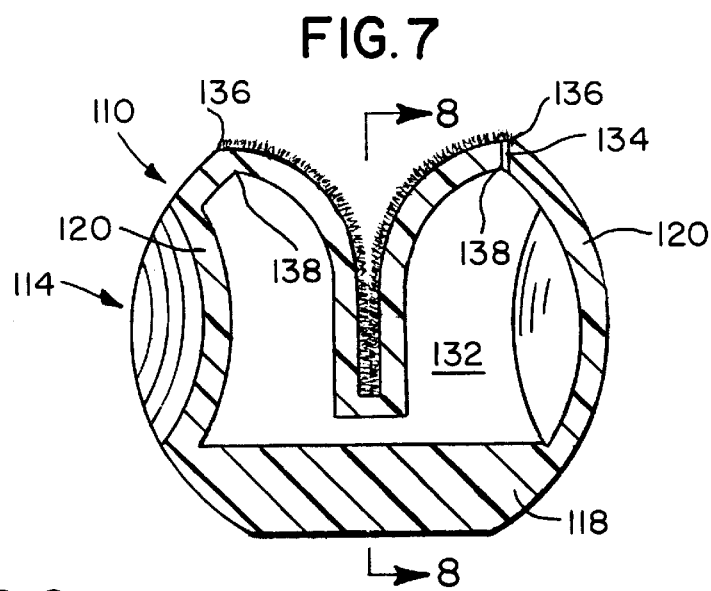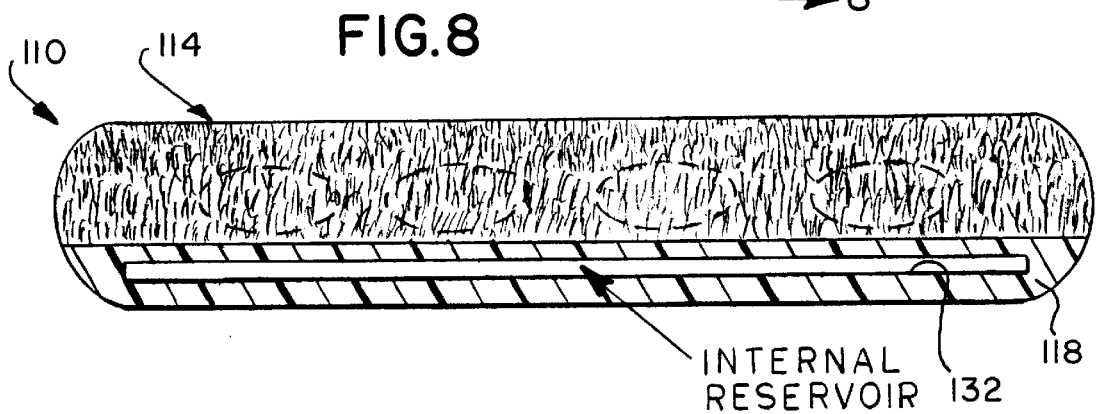

HAND-HELD DEVICE FOR CLEANING A WINDSHIELD WIPER BLADE

BACKGROUND OF THE INVENTION

1. Field of the Invention

The present invention relates to a hand-held device. More particularly, the present invention relates to a hand-held device for cleaning a windshield wiper blade.

2. Description of the Prior Art

Numerous innovations for windshield wiper blade cleaning devices have been provided in the prior art that will be described. Even though these innovations may be suitable for the specific individual purposes to which they address, however, they differ from the present invention.

A FIRST EXAMPLE, U.S. Pat. No. 3,631,561 to Aszkenas teaches a cleaning unit adapted to be held in place by any standard type of automobile windshield wiper blade. The unit has an elongated opening through which the wiper blade projects. The cleaning unit may be solely a snap-on ice scraper or a snap-on sponge and squeegee combination for cleaning a wet windshield. The device is of a clear plastic and is bendable to conform to the windshield curvature.

A SECOND EXAMPLE, U.S. Pat. No. 4,649,593 to Gilliam, III et al. teaches a combined windshield wiping and cleaning device that has a scrubbing member with a reticular surface for removing solid matter along with a wiper member for squeegee removal of water. These are formed together with a supporting base as a single monolithic extrusion of an elastomeric material. It fits into the windshield wiper arm in the same way as current blades which only wipe.

A THIRD EXAMPLE, U.S. Pat. No. 5,243,731 to Yang teaches a windshield wiper that includes a pair of wiper blades pivotally secured to an H-shaped connecting seat which is in turn pivotally secured to a shaft carried by a wiper arm, with the connecting seat having a pair of cleaner strips positioned outwardly of the wiper blades for cleaning the blades prior to their alternating engagement against the windshield during the back and forth movement of the wiper arm.

A FOURTH EXAMPLE, U.S. Pat. No. 5,860,182 to Sareyani teaches a hand-held device for sliding along the length of a windshield wiper blade to clean it. The device includes a resilient hollow, cylindrical shell which houses two cleaning strips forming a V-shaped groove. The wiper blade is accommodated within the V-shaped groove and the two legs of the shell are squeezed together and slid along the length of the blade to remove dirt therefrom. The device is optionally equipped with an ice-scraping ridge on one leg of the shell, and/or an absorbent cleaning ridge on the other leg of the shell, and insect-scraping grooves running along the base.

It is apparent that numerous innovations for windshield wiper blade cleaning devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a hand-held device for cleaning a windshield wiper blade that avoids the disadvantages of the prior art.

ANOTHER OBJECT of the present invention is to provide a hand-held device for cleaning a windshield wiper blade that is simple and inexpensive to manufacture.

STILL ANOTHER OBJECT of the present invention is to provide a hand-held device for cleaning a windshield wiper blade that is simple to use.

BRIEFLY STATED, YET ANOTHER OBJECT of the present invention is to provide a hand-held device for cleaning a windshield wiper blade that includes a body for holding in the hand of a user and bristles extending from the body for cleaning the windshield wiper blade. The body is substantially channel-shaped, slender, elongated, and has a web with an inner face and a pair of terminal ends, and a pair of flanges that extend from the web, each of which has an inner face, an outer face, and a pair of terminal ends. The inner face of the web has a length that axially tapers inwardly and upwardly at the pair of terminal ends of the web for facilitating insertion of the windshield wiper blade. The inner face of each flange axially diverges outwardly at the pair of terminal ends thereof and convexly upwardly along the length thereof for further facilitating insertion of the windshield wiper blade. The outer face of each flange axially diverges outwardly at the pair of terminal ends thereof and convexly upwardly along the length thereof for maximizing resiliency.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

DESCRIPTION OF THE DRAWING

The figures on the drawing are briefly described as follows:

FIG. 1 is a diagrammatic perspective view of the present invention in use;

FIG. 2 is an enlarged diagrammatic perspective view of the area generally enclosed in the dotted curve identified by arrow 2 in FIG. 1 of the present invention;

FIG. 3 is an enlarged diagrammatic side elevational view taken generally in the direction of arrow 3 in FIG. 2;

FIG. 4 is a diagrammatic top plan view taken generally in the direction of arrow 4 in FIG. 3;

FIG. 5 is an enlarged diagrammatic end view taken generally in the direction of arrow 5 in FIG. 4;

FIG. 6 is an enlarged diagrammatic cross sectional view taken on line 6—6 in FIG. 4;

FIG. 7 is an enlarged diagrammatic cross sectional view taken on line 7—7 in FIG. 4 of an alternate embodiment of the present invention;

FIG. 8 is an enlarged diagrammatic cross sectional view taken on line 8—8 in FIG. 7;

FIG. 9 is another alternate embodiment of the present invention;

FIG. 10 is a diagrammatic perspective view of the first step in utilizing the present invention;

FIG. 11 is a diagrammatic end view of the next step in utilizing the present invention; and FIG. 12 is a diagrammatic perspective view of the last step in utilizing the present invention.

LIST OF REFERENCE NUMERALS UTILIZED IN THE DRAWING

Preferred Embodiment 10 hand-held device of the present invention for cleaning windshield wiper blade 12

12 windshield wiper blade
14 body for holding in hand of user
16 bristles for cleaning windshield wiper blade 12
18 web of body 14
20 pair of flanges of body 14
22 inner face of web 18 of body 14 for facing windshield wiper blade 12
23 pair of terminal ends of web 18 of body 14
24 inner face of each flange of pair of flanges 20 of body 14 for facing windshield wiper blade 12
26 outer face of each flange of pair of flanges 20 of body 14
28 pair of terminal ends of each flange of pair of flanges 20 of body 14
30 plurality of indents in outer face 26 of each flange of pair of flanges 20 of body 14 for fingers and thumb of user
36 highest point of inner face 24 of each flange 20 of body 14

First Alternate Embodiment 110 hand-held device
114 body
118 web of body 114
132 internal reservoir contained in body 114 for holding cleaning liquid
134 plurality of ducts contained in body 114 for conducting cleaning liquid from internal reservoir 132 in body 114 to ambient
136 pair of highest points of pair of flanges 120
138 pair of highest points of internal reservoir 132 contained in body 114

Second Alternate Embodiment 210 hand-held device
240 slender and elongated handle for reaching high windshield wiper blades

DETAILED DESCRIPTION OF THE PREFERRED EMBODIMENT

Referring now to the figures, in which like numerals indicate like parts, and particularly to FIG. 1, the hand-held device of the present invention is shown generally at 10 for cleaning a windshield wiper blade 12.

The configuration of the hand-held device 10 can best be seen in FIGS. 2–6, and as such, will be discussed with reference thereto.

The hand-held device 10 comprises a body 14 for holding in the hand of a user, and bristles 16 extending from the body 14 for cleaning the windshield wiper blade 12.

The body 14 is made from a resilient material.

The body 14 is substantially channel-shaped, slender, elongated, and has a web 18 and a pair of flanges 20 that extend from the web 18 of the body 14.

The web 18 of the body 14 has an inner face 22 for facing the windshield wiper blade 12 and a pair of terminal ends 23.

Each flange 20 of the body 14 has an inner face 24 with a length for facing the windshield wiper blade 12, an outer face 26 with a length that meets a respective inner face at a highest point 36 thereof, and a pair of terminal ends 28.

The inner face 22 of the web 18 has a length that axially tapers inwardly and upwardly at the pair of terminal ends 23 of the web 18 of the body 14.

The inner face 24 of each flange 20 axially diverges outwardly at the pair of terminal ends 28 thereof and convexly upwardly along the length thereof.

The outer face 26 of each flange 20 axially diverges outwardly at the pair of terminal ends 28 thereof and convexly upwardly along the length thereof for maximizing resiliency.

The outer face 26 of each flange 20 has a plurality of indents 30 therein that are spaced therealong, with the indents 30 on the outer face 26 of one flange 20 for the fingers of the user and being staggered relative to the indents 30 on the outer face 26 of the other flange 20 for the thumb of the user.

The plurality of indents 30 on the outer face 26 of each flange 20 are elliptically-shaped for the pads of the fingers and thumb of the user.

A first alternate embodiment of the hand-held device 110 can best be seen in FIGS. 7 and 8, and as such, will be discussed with reference thereto.

The hand-held device 110 is identical to the hand-held device 10, except that the body 114 contains an internal reservoir 132 for holding a cleaning liquid and a plurality of ducts 134 that fluidly communicate with the internal reservoir 132 contained in the body 114 and extend therefrom to the ambient for conducting the cleaning liquid from the internal reservoir 132 in the body 114 to the ambient.

The internal reservoir 132 in the body 114 extends axially in the web 118 of the body 14 and extends upwardly therefrom into the pair of flanges 120 of the body 114, to a pair of highest points 138.

The plurality of ducts 134 in the body 114 extend from spacingly along, and fluidly communicating with, the pair of highest points 138 of the internal reservoir 132, to spacingly along, and fluidly communicating with, the pair of highest points 136 of the pair of flanges 120.

The plurality of ducts 134 in one flange 120 of the body 114 are staggered from, and alternate relative to, the plurality of ducts 134 in the other flange 120 of the body 114.

A second alternate embodiment of the hand-held device 210 can best be seen in FIG. 9, and as such, will be discussed with reference thereto.

The hand-held device 210 is identical to the hand-held devices 10 and 110, but with the addition of a slender and elongated handle 240 that is pivotally mounted to the hand-held devices 10 and 110 for reaching high windshield wiper blades.

The method of using the hand-held devices 10, 110, 210, can best be seen in FIGS. 10–12, and as such, will be discussed with reference thereto.

STEP 1: As shown in FIG. 10, dip the body 14, 114 into a source of cleaning liquid.

STEP 2: As shown in FIG. 11, insert the windshield wiper blade 12 between the pair of flanges 20, 120 of the body 14, 114, respectively.

STEP 3: As shown in FIG. 12 run the body 14, 114 reciprocatingly along, and squeeze against, the windshield wiper blade 14 so as to expel the cleaning fluid.

It will be understood that each of the elements described above, or two or more together, may also find a useful application in other types of constructions differing from the types described above.

While the invention has been illustrated and described as embodied in a hand-held device for cleaning a windshield wiper blade, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A hand-held device for cleaning a windshield wiper blade, comprising:
   a) a body for holding in the hand of user; said body being substantially channel-shaped, slender, elongated, and having:
      i) a web; said web of said body having:
         1) an inner face for facing the windshield wiper blade; and
         2) a pair of terminal ends; said inner face of said web having a length axially tapering inwardly and upwardly at said pair of terminal ends of said web of said body; and
      ii) a pair of flangs extending from said web of said body; each flange of said body having:
         1) an inner face with a length for facing the windshield wiper blades;
         2) an outer face with a length meeting a respective inner face at a highest point thereof; and
         3) a pair of terminal ends; said inner face of each flange axially diverging outwardly at said pair of terminal ends thereof and convexly upwardly along said length therof; and
   b) bristles extending from said body for cleaning the windshield wiper blade.

2. The device as defined in claim 1, wherein said body is made from a resilient material.

3. The device as defined in claim 1, wherein said outer face of each flange axially diverges outwardly at said pair of terminal ends thereof and convexly upwardly along said length thereof.

4. The device as defined in claim 1, wherein said outer face of each flange has a plurality of indents therein that are spaced therealong.

5. The device as defined in claim 4, wherein said indents on said outer face of one flange are for the fingers of the user and being staggered relative to said indents on said outer face of the other flange for the thumb of the user.

6. The device as defined in claim 4, wherein said plurality of indents on said outer face of each flange are elliptically-shaped for the pads of the fingers and thumb of the user.

7. The device as defined in claim 1, wherein said body contains:
   a) an internal reservoir for holding a cleaning liquid; and
   b) a plurality of ducts that fluidly communicate with said internal reservoir contained in said body and extend therefrom to the ambient for conducting the cleaning liquid from said internal reservoir in said body to the ambient.

8. The device as defined in claim 7, wherein said internal reservoir in said body extends axially in said web of said body and extends upwardly therefrom into said pair of flanges of said body, to a pair of highest points.

9. The device as defined in claim 8, wherein said plurality of ducts in said body extend from spacingly along, and fluidly communicating with, said pair of highest points of said internal reservoir, to spacingly along, and fluidly communicating with, said pair of highest points of said pair of flanges of said body.

10. The device as defined in claim 8, wherein said plurality of ducts in one flange of said body are staggered from, and alternate relative to, said plurality of ducts in the other flange of said body.

11. The device as defined in claim 1, further comprising a slender and elongated handle being pivotally mounted to said body for reaching high windshield wiper blades.

* * * * *